J. E. GLEASON AND A. L. STEWART.
METHOD OF AND MACHINE FOR CUTTING GEARS OR WHEELS.
APPLICATION FILED DEC. 26, 1914.

1,349,951.

Patented Aug. 17, 1920.
9 SHEETS—SHEET 1.

J. E. GLEASON AND A. L. STEWART.
METHOD OF AND MACHINE FOR CUTTING GEARS OR WHEELS.
APPLICATION FILED DEC. 26, 1914.

1,349,951.

Patented Aug. 17, 1920.

J. E. GLEASON AND A. L. STEWART.
METHOD OF AND MACHINE FOR CUTTING GEARS OR WHEELS.
APPLICATION FILED DEC. 26, 1914.

1,349,951.

Patented Aug. 17, 1920.
9 SHEETS—SHEET 6.

WITNESSES:
Walter B. Payne
H. W. Stonebraker

INVENTORS
James E. Gleason
Arthur L. Stewart
BY
Church Church
their ATTORNEYS

J. E. GLEASON AND A. L. STEWART.
METHOD OF AND MACHINE FOR CUTTING GEARS OR WHEELS.
APPLICATION FILED DEC. 26, 1914.

1,349,951.

Patented Aug. 17, 1920.
9 SHEETS—SHEET 7.

WITNESSES:

INVENTORS
James E. Gleason
Arthur L. Stewart
BY
their ATTORNEYS

J. E. GLEASON AND A. L. STEWART.
METHOD OF AND MACHINE FOR CUTTING GEARS OR WHEELS.
APPLICATION FILED DEC. 26, 1914.

1,349,951.

Patented Aug. 17, 1920.
9 SHEETS—SHEET 9.

WITNESSES:
Walter B. Payne
H. C. Stonebraker

INVENTORS
James E. Gleason
Arthur L. Stewart
BY
Church Rich
their ATTORNEYS

UNITED STATES PATENT OFFICE.

JAMES E. GLEASON AND ARTHUR L. STEWART, OF ROCHESTER, NEW YORK, ASSIGNORS TO GLEASON WORKS, OF ROCHESTER, NEW YORK, A CORPORATION OF NEW YORK.

METHOD OF AND MACHINE FOR CUTTING GEARS OR WHEELS.

1,349,951.  Specification of Letters Patent.  Patented Aug. 17, 1920.

Application filed December 26, 1914. Serial No. 879,026.

*To all whom it may concern:*

Be it known that we, JAMES E. GLEASON and ARTHUR L. STEWART, both of Rochester, in the county of Monroe and State of New York, have invented certain new and useful Improvements in Methods of and Machines for Cutting Gears or Wheels; and we do hereby declare the following to be a full, clear, and exact description of the same, reference being had to the accompanying drawings, forming a part of this specification and to the reference numerals marked thereon.

The invention pertains generally to a method of and machines for cutting teeth or blades on gears, wheels, or similar bodies, and among the various possible applications, it is designed more particularly with reference to the production of curved, generated teeth on bevel gears, the chief purpose being to afford an improved method and mechanism for producing theoretically correct curved gear teeth speedily and with accuracy. The method consists, broadly stated, in moving a cutting tool in a curved path in a plane substantially tangent to the pitch surface of the gear to be produced to shape the tooth, imparting a continuous indexing movement or rotation to the blank, and simultaneously causing a relative rolling movement between the blank and tool during the cutting operation to generate the tooth. To these and other ends the invention consists in certain improvements and combinations of parts all as will be hereinafter more fully described, the novel features being pointed out in the claims at the end of the specification.

In the drawings.

Similar reference characters in the several figures indicate the same parts.

The embodiment of the invention herein shown and described is intended merely for the purpose of illustration, and while designed for producing what is known in the art as a curved gear tooth, it is to be understood that the invention is likewise adapted for producing curved cuts on wheels or similar bodies, to form blades, teeth or the like, and in the following description and claims the term "tooth" is employed as comprehending a blade or similar portion produced on the periphery or other face of a wheel by means of cuts or slots formed on opposite sides of the tooth. Where the terms "generating motion" or "rolling motion," are employed, they are used synonymously, and together with "generated tooth" refer to the relative movement between the blank and tool, corresponding to the movement of a gear rolling upon a rack, and resulting in the formation, or generation, as it is called, of a theoretically correct profile or side of the tooth. The term "indexing motion" refers to the movement of the blank, whereby different teeth are brought successively into position for a tool to engage, the blank of the present invention having a continuing indexing motion after the manner of a hobbing machine. The invention contemplates the production of "curved" teeth, and this expression refers to the shape of a tooth longitudinally, or from end to end, and is intended to define or comprehend the form or forms of teeth which are variously known in the art as curved, spiral and circular.

The present machine may be described in its broad aspect as including a rotary tool head on which are mounted a series of tools or cutters arranged in spaced relation to each other movable in a curved path in a plane substantially tanght to the pitch surface of the gear or wheel, the disposition of the tools being such that when the tool head is continuously rotated in engagement with a continuously rotating blank, the cutters successively engage different portions of the blank, each operating to make a single cut on the side of a tooth until all the teeth are completed. This result may be obtained by arranging the tools so as to engage corresponding sides of every other tooth, or by having the tools arranged in pairs to engage the adjacent sides of adjacent teeth, the first mentioned arrangement requiring two revolutions of the blank to make one cut on one side of each tooth, while the latter arrangement requires one revolution of the blank to make one cut on both sides of each tooth, all of which will be fully explained in the following description. In addition to the indexing movement of the blank carrier, the latter is also controlled in such a manner as to have imparted thereto a rolling movement, or generating movement, with relation to the tool in operation at any particular moment, for the purpose of generating or automatically producing theoretically correct sides on the teeth, and this is accomplished by rolling both the tool head and the blank, the parts being geared together, so that the rolling movement of the tool head, which is mounted on an automatically oscillated support, is transmitted to the gear blank, this rolling motion of the tool head being added to or subtracted from the indexing movement of the blank by differential gearing, according to whether the direction of roll is the same as, or contrary to, the indexing movement of the blank. In this class of work, it is customary to rough out the blanks, without finishing the sides of the teeth, and to subsequently put them through a finishing machine, and the present apparatus may be utilized either in the capacity of finishing a blank, in which the rough cuts have already been produced, or in making a completed operation, that is to say, entirely finishing the teeth of a blank which has not been preliminarily subjected to a roughing out operation.

In the present mechanism 1 designates the base on which is mounted a bed 2, the support for the tool head being arranged on the bed 2 for movement back and forth. To this end, the said bed includes ways 3 which are engaged by tracks 4 carried by the cradle or tool head support 5. 6 is a standard, arranged for horizontal adjustment on the cradle 5, and provided with vertical guideways 7 on which is arranged the housing 8. Journaled in suitable bearings on the housing 8, is a spindle 9 which is adjustable longitudinally of the housing, and carries the tool head 10 fixed thereon. Also fixed on the spindle 9 is the internal gear 11 by means of which the tool head is driven through the following train of gearing. 12 designates the main drive shaft of the machine having fixed thereon a pulley 13 to which power may be applied. The shaft 12 carries at its inner end a pinion 14, engaging a double pinion 15 fixed on the transverse shaft 16. The pinion 15 drives the vertical shaft 17, provided at its lower end with a bevel gear 18 and slidably mounted in bearings provided near its upper end for this purpose. The shaft 17 carries a bevel pinion 19 engaging a corresponding gear 20 on shaft 21, the latter carrying at its opposite end a pinion 22. The pinion 22 engages pinion 23 which is fixed on the shaft 24, the last mentioned shaft carrying at its outer end a pinion 25 engaging the internal gear 11. By the means just described, it will be seen that the tool head is continuously driven in one direction, and the means by which the indexing motion is imparted to the blank carrier and the generating motions to the blank carrier and tool head will now be described.

Figures 1, 16:
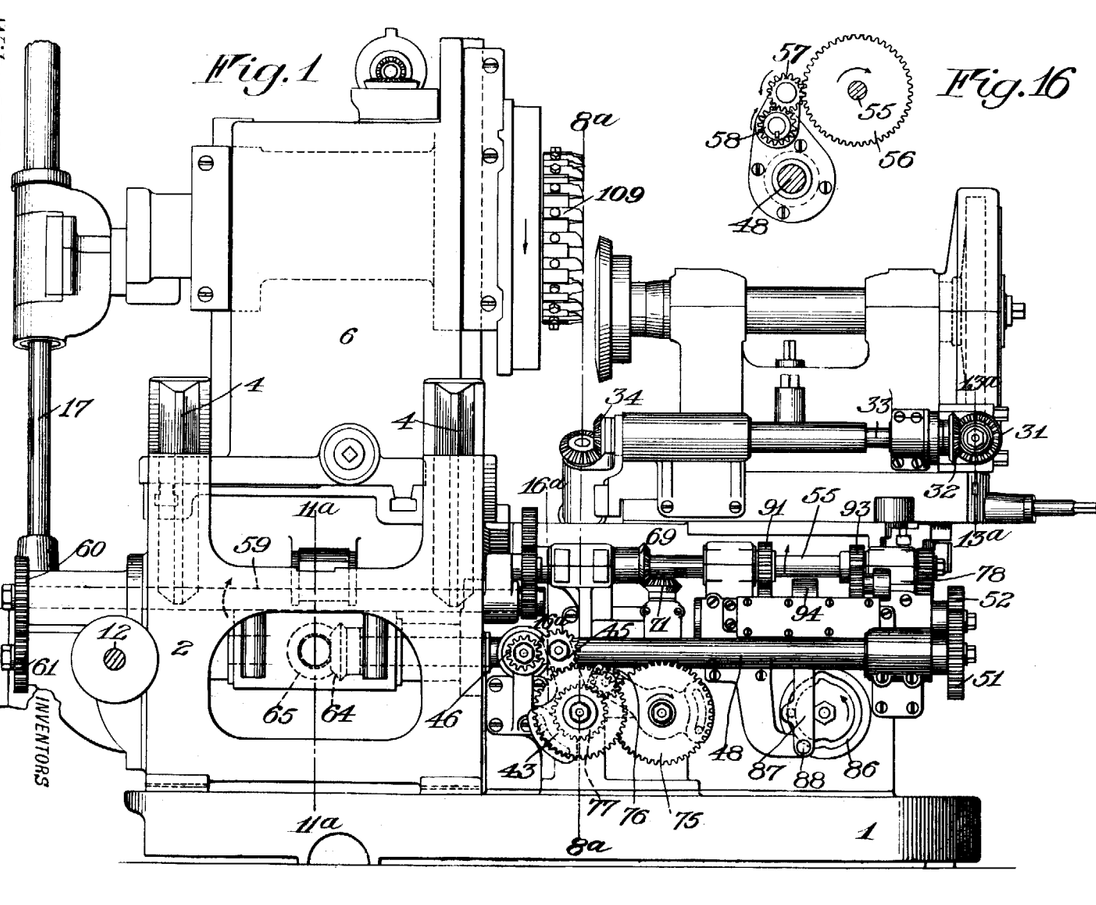
Figure 1 is a side elevation of a machine, illustrating the invention in one of its possible embodiments, the blank and tool head being out of cutting relation.
Fig. 16 is a sectional view on the line 16ª—16ª of Fig. 1.
Figure 2:
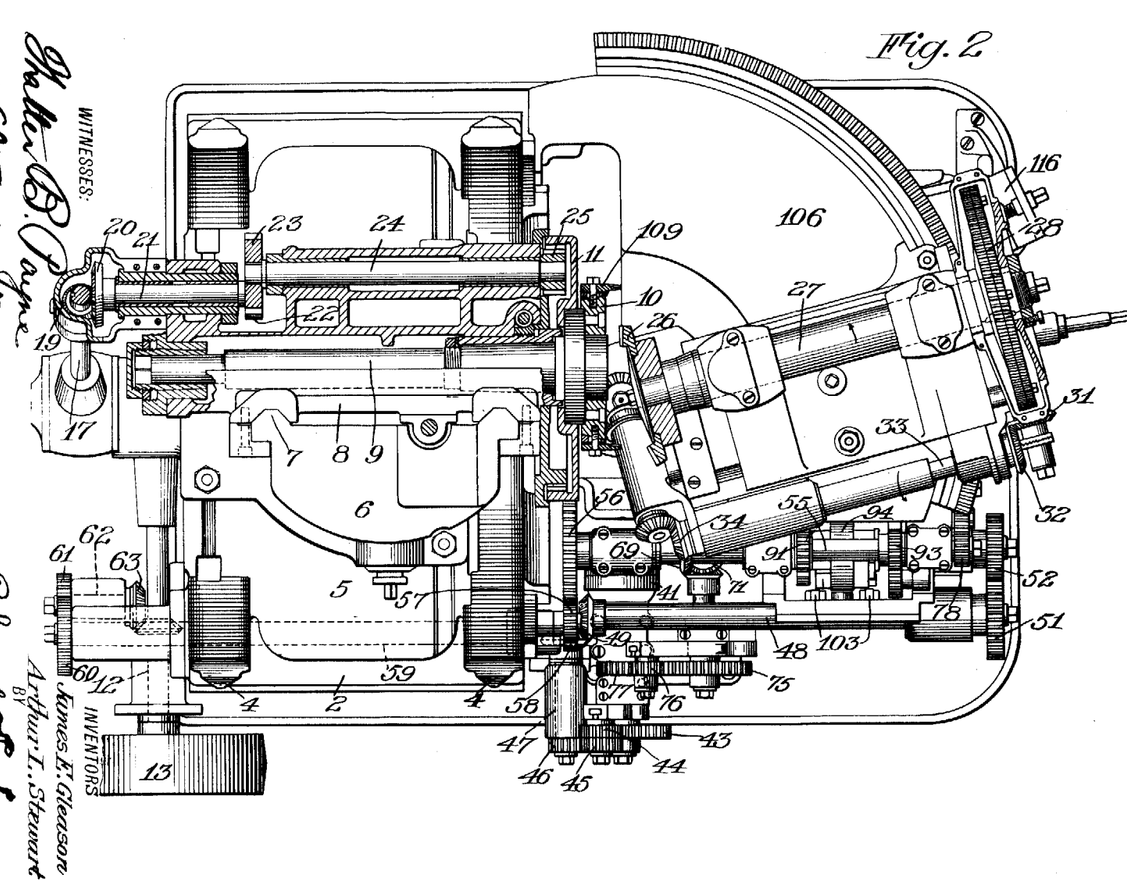
Fig. 2 is a plan view with parts in section, the blank being partially fed in to the full cutting depth.
Figures 3, 5:
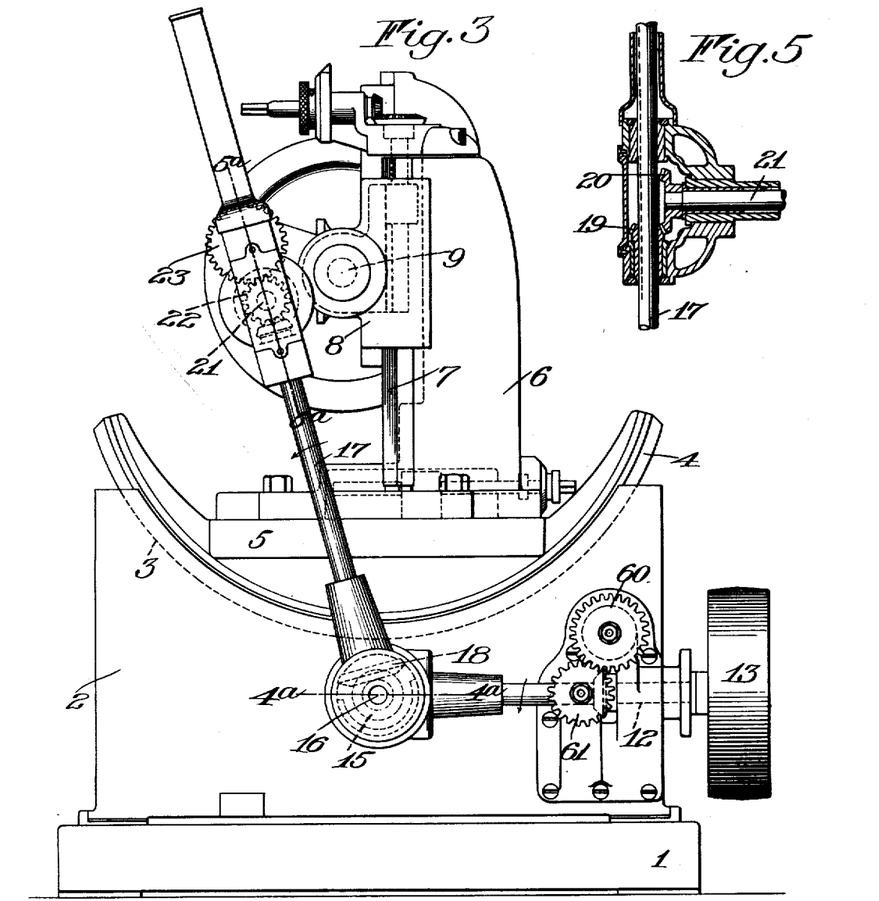
Fig. 3 is an end elevation, looking toward the right of Fig. 1.
Fig. 5 is a vertical sectional view on the line 5ª—5ª of Fig. 3.
Figure 4:
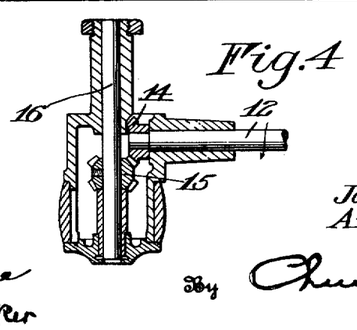
Fig. 4 is a horizontal sectional view on the line 4ª—4ª of Fig. 3.
Figure 6:
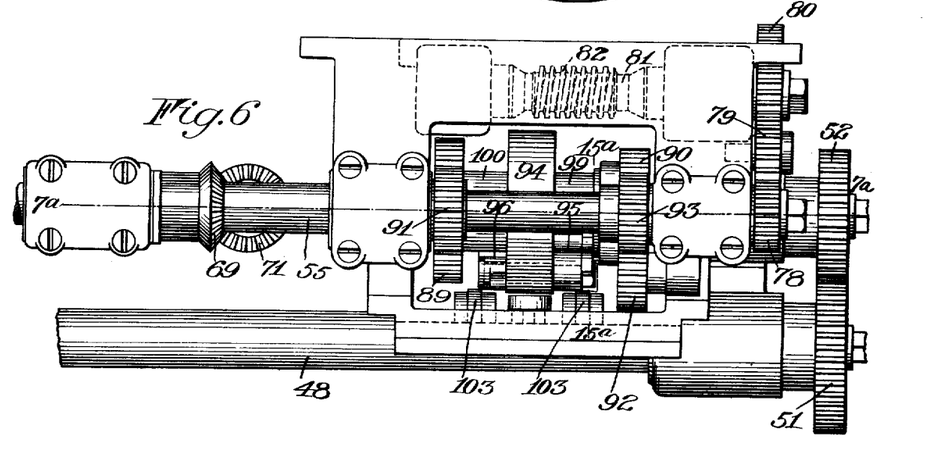
Fig. 6 is a plan view of the reversing mechanism shown generally in Fig. 1.
Figure 7:
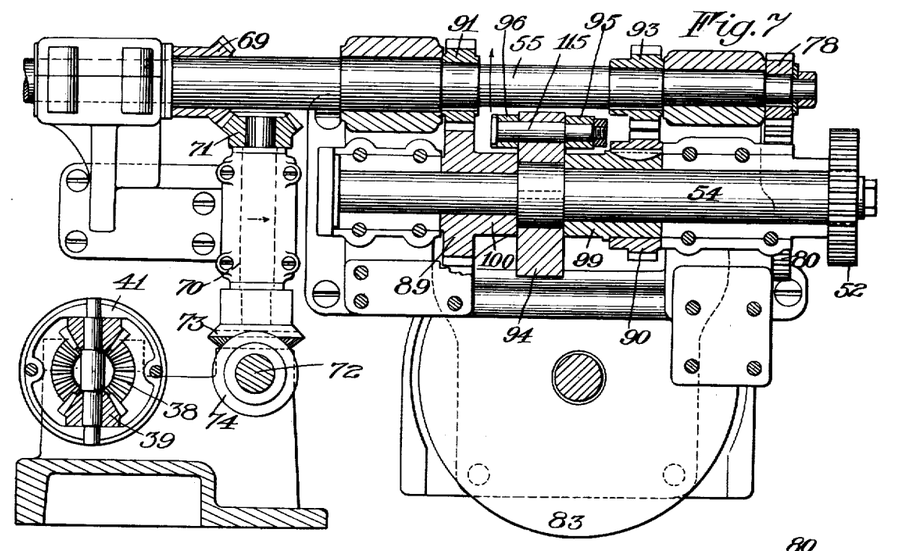
Fig. 7 is a sectional view on the line 7ª—7ª of Fig. 6, with parts appearing in elevation.
Figure 8:
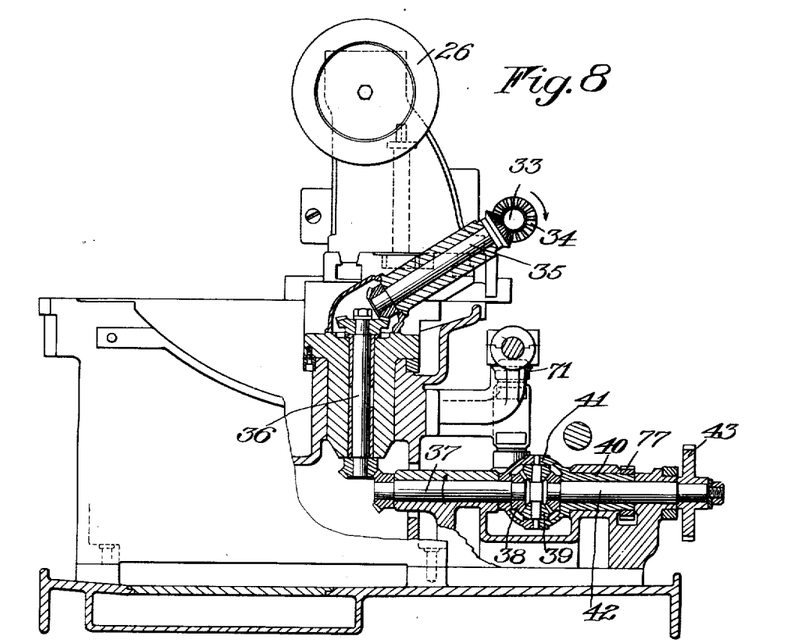
Fig. 8 is a vertical sectional view on the line 8ª—8ª of Fig. 1, partially in elevation.
Figure 9:
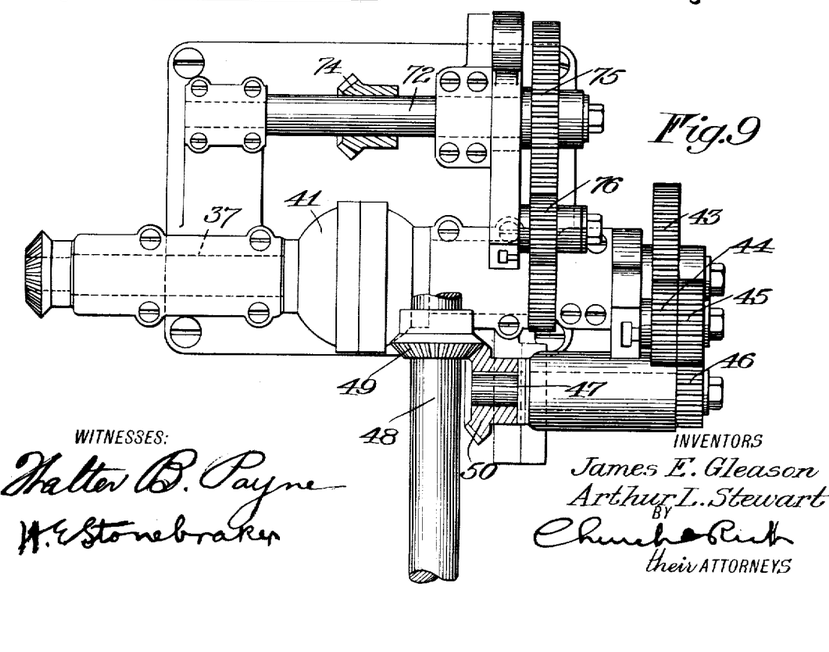
Fig. 9 is a plan view of a portion of the gearing which controls the movement of the blank carrier, showing the arrangement whereby the combined indexing and rolling, or generating, movement of the blank carrier is obtained.
Figure 10:
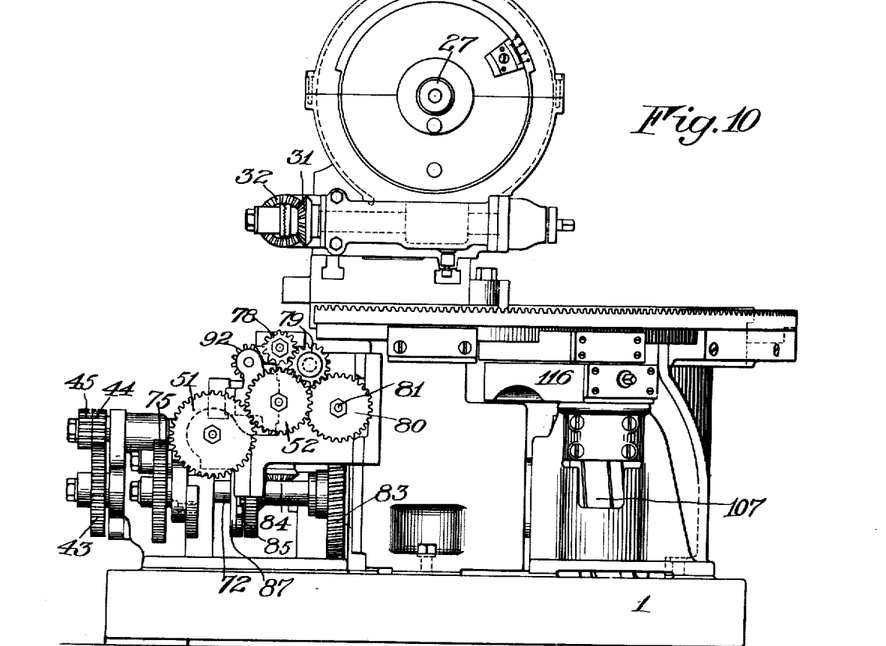
Fig. 10 is an end elevation, looking toward the left of Figs. 1 and 2.
Figure 11:
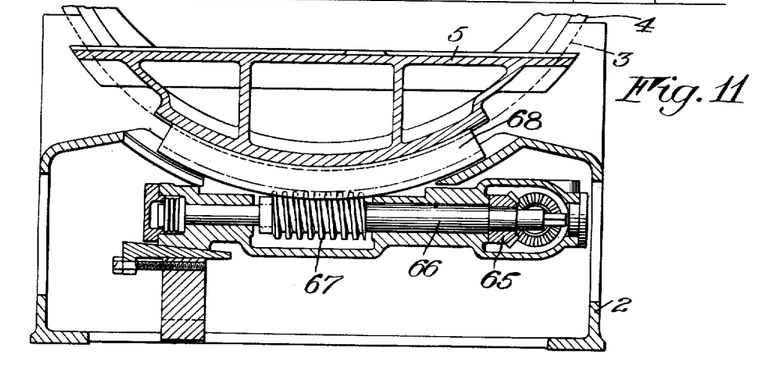
Fig. 11 is a vertical sectional view on the line 11ª—11ª of Fig. 1.
Figure 12:
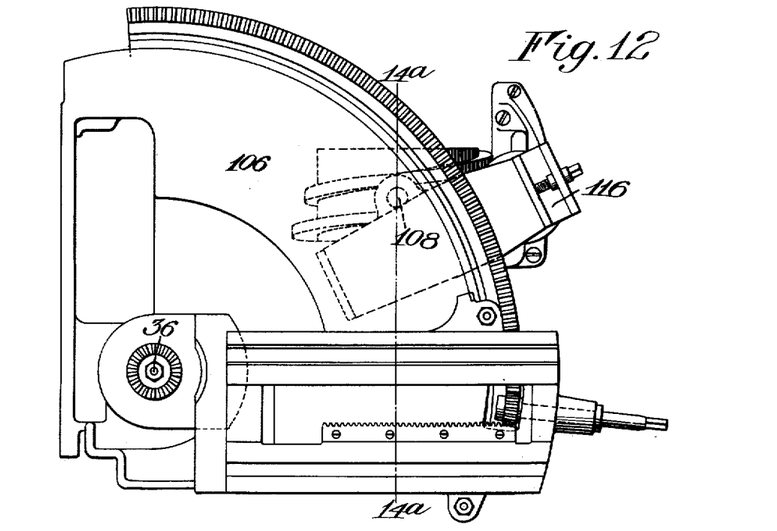
Fig. 12 is a plan view of the table on which the blank carrier is mounted, parts above the table being removed.
Figure 13:
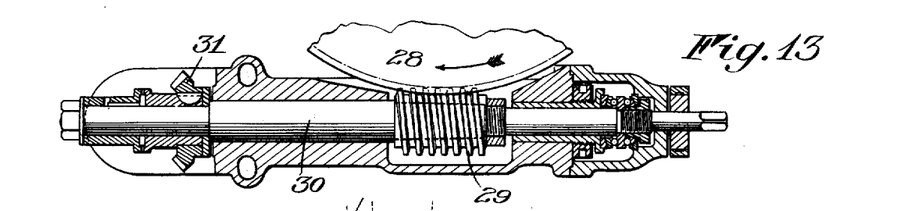
Fig. 13 is a sectional view on line 13ª—13ª of Fig. 1.
Figures 14, 15:
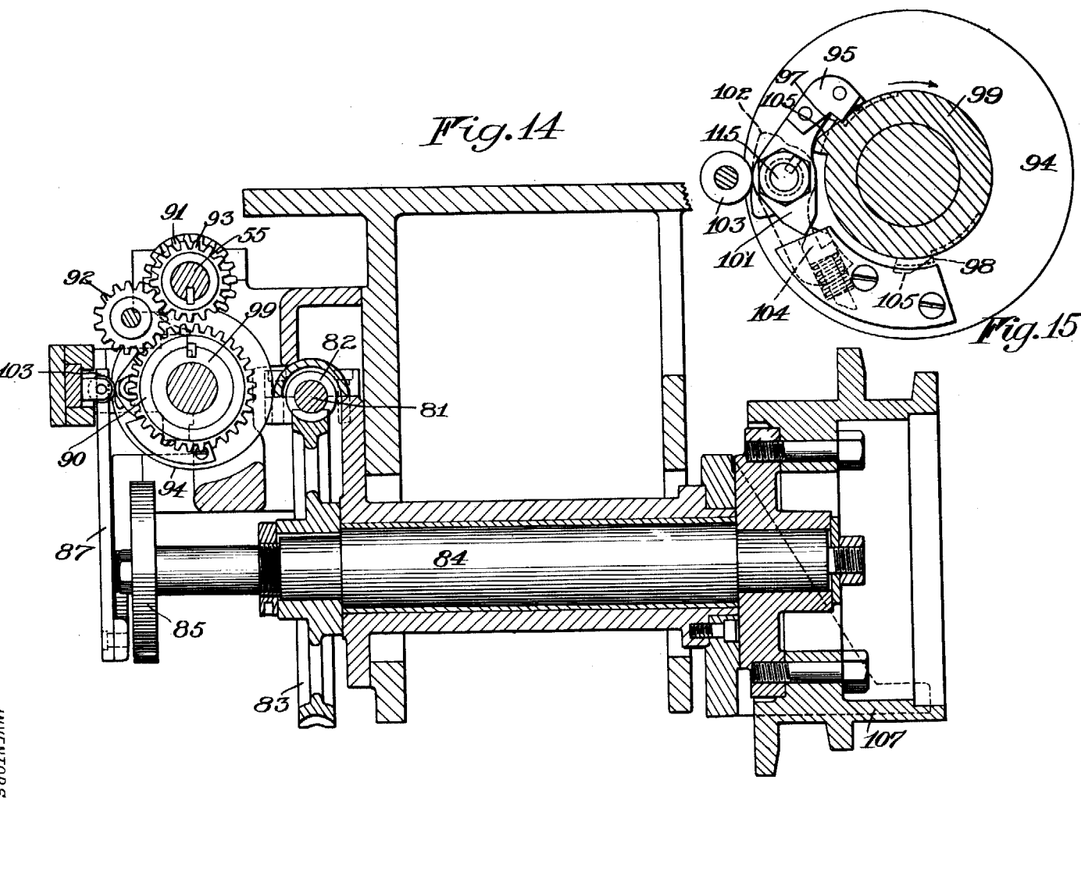
Fig. 14 is a sectional view on the line 14ª—14ª of Fig. 12, showing the gearing which controls the movement of the blank carrier table.
Fig. 15 is a sectional view on the line 15ª—15ª of Fig. 6.

The blank, or gear, is designated at 26, and is mounted on a blank carrier 27, the latter being provided with a worm wheel 28 fixed thereon and driven by a worm 29. 30 is a shaft carrying the worm 29 and also a bevel pinion 31 which is driven by the bevel pinion 32 arranged on shaft 33. The latter carries a bevel gear 34 which is driven from the shaft 35, which in turn is operated from shafts 36 and 37 by means of the gearing shown in Fig. 8. The shaft 37 has fixed thereon a bevel pinion 38 meshing with pinions 39, carried by the sleeve 40 of a differential gearing 41. 42 is a shaft carrying the gear 43 which is driven by a gear 44 mounted on a stub shaft which also carries a gear 45. The latter meshes with a gear 46 on the shaft 47 which is driven from shaft 48 through bevel gears 49 and 50. The shaft 48 carries at its outer end a gear 51 which meshes with a gear 52, mounted on the reversible shaft 54, which is controlled by a reversing mechanism that will be described hereinafter. The shaft 54 is driven from the shaft 55, carrying a gear 56, operated through the idler gear 57 by the gear 58 mounted on the main shaft 59. The shaft 59 is provided at one end with a gear 60 which is engaged by a gear 61 on stub shaft 62. The latter carries a bevel pinion 63 engaged by a corresponding pinion on the drive shaft 12.

The oscillatory or rolling movement of the tool head support or cradle is effected from the shaft 48, which is alternately driven in opposite directions through the reversing mechanism already mentioned, and to this end shaft 48 carries a bevel gear 64, which drives a corresponding pinion 65 on a shaft 66. The last mentioned shaft is mounted in suitable bearings beneath the cradle and is provided with a worm 67 having engagement with a segmental worm gear 68 secured to the cradle. With this arrangement it will be seen that a generating movement is imparted to the blank carrier through the differential 41 in accordance with the movements of the cradle which carries the tool head, and the means for imparting the indexing motion to the blank will now be set forth.

For indexing, the blank is driven continuously in one direction, and to this end the shaft 55 carries a pinion 69 which drives the shaft 70 through pinion 71. The shaft 70 in turn drives the spindle 72 by means of pinions 73 and 74, and mounted on the spindle 72 is a gear 75 meshing with an idler 76 which latter engages the gear wheel 77 fixed on the sleeve 40 of the differential gearing. The drive mechanism is so arranged that when the tool head is rolling in the same direction that the blank travels, an increased movement is given to the blank through the differential mechanism, and when the tool head is rolling in the opposite direction, or reverse to the indexing movement of the blank, such indexing movement is retarded, and thus the blank, rotating about its own axis, is given a movement which is the resultant or combination of the indexing and generating motions, and is so proportioned with relation to the rolling movement of the tool head that the respective tools are severally brought into correct cutting relation with different portions of the blank while at the same time the side or profile of each tooth is generated, due to the constantly changing relative position of each tool, resulting from the rolling or generating movement of the tool head.

After the tool head has rolled to the limit of its movement in one direction it is necessary to reverse its direction of movement, and the present machine is designed with the idea of cutting the blank during the rolling movement of the tool head in both directions, although it may be desirable to withdraw the blank from cutting relation with the tool head during the reverse movement of the cradle. In order to effect such change of direction of movement, the shaft 55 carries at one end a pinion 78 which engages the idler 79, the latter meshing with gear wheel 80 on worm shaft 81. 82 is a worm fixed on the worm shaft 81 and engaging the worm gear 83 which is keyed to the spindle 84. 85 is a disk fixed on the spindle 84 and provided with a cam slot 86 which governs the movement of a lever 87, the latter being pivoted at 88 and movable first in one direction and then in the other by engagement with the cam slot 86, and resulting in the alternate reversal of the shaft 48 in the manner in which will now be described.

Loosely mounted on shaft 54 is a pair of gears 89 and 90, the gear 89 being driven directly from pinion 91 on shaft 55, while gear 90 is driven through idler gear 92 from pinion 93 on shaft 55. The gears 89 and 90 are thus driven in opposite directions and adapted to be alternately locked to the shaft 54. To this end, the latter has fixed thereon a pawl carrier or collar 94 on which are pivotally mounted locking pawls 95 and 96, both fixed on a pin 115, and arranged for engagement with shoulders 97 and 98 on sleeves carried by the gears 89 and 90, and designated at 99 and 100. The locking pawls 95 and 96 are provided with tail pieces or operating portions 101 and 102 which are engaged by a roller 103 carried on the lever 87, when the latter is moved into the path of one or the other of said pawls. The collar 94 also carries a spring actuated locking pin 104, arranged in a suitable housing and operating on the tail piece 101 of pawl 95, so as to retain one or the other of the pawls in locked relation with the collar until the roller 103 is operated to engage the other pawl and thus release the first mentioned one. The sleeves 99 and 100 are preferably provided with the inclined projections 105 which are adapted to engage the pawl and carry them fully into their released position, in case the roller 103 does not move them sufficiently for this purpose.

The blank carrier is adjustably mounted on a table 106, the latter being adapted for swinging movement about the central axis 36, when operating on a blank which has not previously been roughed out, in order to feed the blank in so that the tools will cut to the full depth, or down to the root angle. The machine may, with equal facility, be used in finishing blanks in which rough cuts have already been made on a roughing machine, and in this case, the table 106 is held in fixed position. In order to effect the necessary swinging movement of the table 106, we employ a mechanism similar to what is shown in co-pending application, Serial No. 843,720, filed June 8, 1914, and comprising generally a cam 107 mounted on the spindle 84 and engaging projection 108 on a swinging arm 116 adapted to move the table. The spindle 84 is driven at such a speed as to feed the blank toward the cutter slowly so that the tools will cut to the full depth by the time the sides of the teeth are completed.

Figures 17, 18, 19, 20, 21, 22, 23, 24:
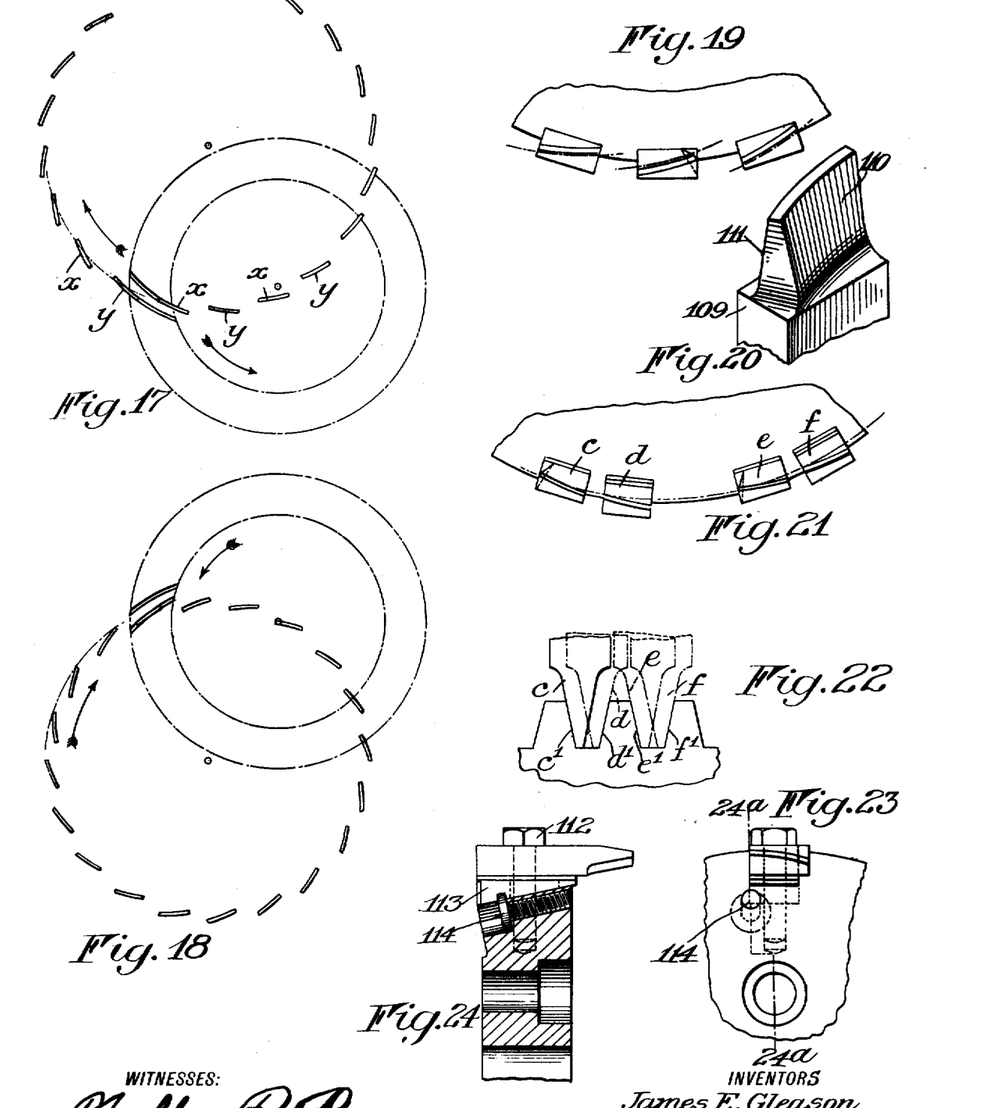
Fig. 17 is a diagrammatic view showing the relative position of the tool head and blank, when cutting a bevel gear.
Fig. 18 is a similar view illustrating the arrangement of tools and relative position of parts for cutting a bevel pinion.
Fig. 19 is a partial elevation of a tool head showing the position of the cutting tools thereon.
Fig. 20 is a perspective view, in part, of one of the tools.
Fig. 21 is a plan view of a tool head, with a modified arrangement of tools, whereby a cut is made on both sides of each tooth during one complete revolution of the blank.
Fig. 22 is a detail view showing the cutting relation of the tools to a blank, with the arrangement of tools shown in Fig. 21.
Fig. 23 is a side elevation of a portion of the tool head, illustrating the arrangement of one of the tools.
Fig. 24 is a sectional view on the line 24ª—24ª of Fig. 23.
Figure 25:
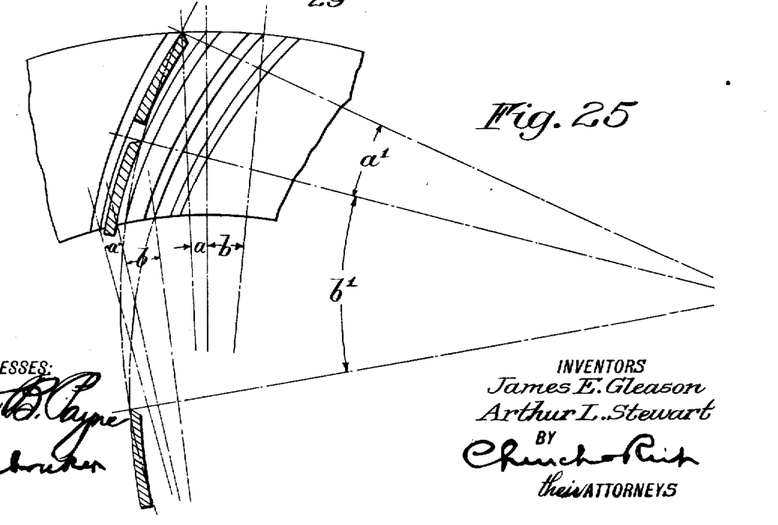
Fig. 25 is a diagrammatic showing of the manner in which the cutting tools coöperate with the teeth of a blank, with the arrangement of tools illustrated in Fig. 21.

In Figs. 17 to 19, inclusive, there is shown an arrangement in which alternate tools have their cutting edges extending in opposite directions, so that for each setting of the blank, only every other tool will operate, the remaining tools being inactive. In the arrangement shown in Fig. 17, for instance, the tools marked $x$ will make a cut each time they pass through the blank, while those marked $y$ pass through the blank without cutting. After the teeth are completed on one side, the blank is reset so as to permit the tools $y$ to operate on the opposite sides of the teeth while the tools $x$ are inactive. A reverse arrangement of tools is shown in Fig. 18 for cutting a pinion. In Figs. 21 and 22 the tools are shown arranged in pairs, the tools of each pair passing through a tooth space successively, and operating on the adjacent sides of adjacent teeth. Thus the tools $c$ and $d$ will cut on the sides $c'$ and $d'$, while tools $e$ and $f$, constituting the next pair on the tool head, cut the sides $e'$ and $f'$ of the teeth forming the next tooth space. In the last described arrangement of cutters, the distance between the cutting edges of each pair of tools preferably bears the same ratio to the distance between the last cutting edge of the pair and the initial cutting edge of the next pair of tools, as the width of the base of the tooth space at one edge bears to the distance from the base of one tooth space to the base of the adjacent tooth space. This is shown in Figs. 22 and 25, where $a'$ is in the same ratio to $b'$ as $a$ is to $b$. One form of cutter is shown in Fig. 20, and embodies a body portion 109 provided with the cutting portion 110, the cutting edge of which is indicated at 111. The tool may be attached to the tool head, as illustrated in Figs. 23 and 24, the tool being held in position by means of a bolt 112, and adjustable with relation to the head through a wedge 113, the position of which is determined by an adjusting screw 114 having engagement with the tool head and with the wedge.

We claim as our invention:

1. The method of cutting a gear or wheel which consists in moving a tool in a curved path in a plane substantially tangent to the pitch surface of the gear to be produced to shape the tooth, imparting a continuous indexing movement to the blank, and simultaneously rolling the blank on its pitch surface to generate the tooth.

2. The method of cutting a gear or wheel which consists in moving a tool in a curved path in a plane substantially tangent to the pitch surface of the gear to be produced to shape the tooth, imparting a continuous indexing movement to the blank, and simultaneously producing a relative rolling motion between the blank and tool to generate the tooth.

3. The method of cutting a gear or wheel which consists in moving a tool in a curved path in a plane substantially tangent to the pitch surface of the gear to be produced to shape the tooth, imparting a generating motion to the blank and the tool to generate the tooth, and producing a continuous indexing movement of the blank.

4. The method of cutting a gear or wheel which consists in moving a tool in a curved path in a plane substantially tangent to the pitch surface of the gear to be produced to shape the tooth, and simultaneously producing a combined rolling and indexing movement of the blank whereby each tooth is generated and the blank is indexed between successive operations of the tool.

5. The method of cutting a gear or wheel which consists in moving a plurality of tools in a curved path in a plane substantially tangent to the pitch surface of the gear to be produced to shape the teeth, producing a relative rolling motion between the blank and the tools to generate the teeth, and simultaneously imparting a continuous indexing movement to the blank.

6. The method of cutting a gear or wheel which consists in moving a plurality of tools in a curved path in a plane substantially tangent to the pitch surface of the gear to be produced to shape the teeth, producing a rolling motion of the blank with relation to the tools to generate the teeth, and simultaneously imparting a continuous indexing movement to the blank.

7. The method of cutting a gear or wheel which consists in moving a plurality of tools in a curved path in a plane substantially tangent to the pitch surface of the gear to be produced to shape the teeth, producing a generating motion of the blank and tools while the latter are cutting, and simultaneously imparting a continuous indexing movement to the blank.

8. The method of forming the side face of a curved gear tooth, which consists in causing a tool to describe a curved path across the face of the blank, imparting a continuous indexing movement to the blank, and simultaneously producing relative rolling motion between the blank and tool along the plane of the curved path of movement of the tool.

9. The method of forming the side face of a curved gear tooth, which consists in causing a tool to describe an arcuate path across the face of the blank in a plane substantially tangent to the pitch surface of the gear to be produced imparting a continuous indexing movement to the blank and simultaneously producing relative rolling motion between the blank and tool along a plane tangent to the pitch line of the blank and normal to the tool axis.

10. The method of forming the side face of a curved gear tooth, which consists in causing a tool to describe a circular path across the face of a blank, imparting a continuous indexing movement to the blank in a plane substantially tangent to the pitch surface of the gear to be produced, and simultaneously producing relative rolling motion between the blank and tool along the plane of the curved path of movement of the tool.

11. The method of forming the side face of a curved gear tooth, which consists in causing a tool to describe a circular path around an axis and across the face of the blank, imparting a continuous indexing movement to the blank, and simultaneously producing relative rolling motion between the blank and tool along a plane tangent to the pitch line of the blank and normal to the tool axis.

12. The method of cutting a gear or wheel which consists in moving a tool in a circular path in a plane substantially tangent to the pitch surface of the gear to be produced to shape the tooth, imparting a continuous indexing movement to the blank and simultaneously rolling the blank on its pitch surface to generate the tooth.

13. The method of cutting a gear or wheel which consists in moving a tool in a circular path in a plane substantially tangent to the pitch surface of the gear to be produced to shape the tooth, producing a relative rolling motion between the blank and the tool to generate the tooth, and imparting a continuous indexing movement to the blank.

14. The method of cutting a gear or wheel which consists in moving a tool in a circular path in a plane substantially tangent to the pitch surface of the gear to be produced to shape the tooth, and simultaneously imparting to the blank a combined indexing movement, and rolling movement with reference to the tool.

15. The method of cutting a gear or wheel which consists in moving a plurality of tools in a circular path in a plane substantially tangent to the pitch surface of the gear to be produced to shape the teeth, producing a relative rolling motion between the blank and the tools to generate the teeth, and simultaneously imparting a continuous indexing movement to the blank.

16. The method of cutting a gear or wheel which consists in moving a plurality of tools in a circular path in a plane substantially tangent to the pitch surface of the gear to be produced to shape the teeth, producing a generating motion of the blank and the tools to generate the teeth, and simultaneously imparting a continuous indexing movement to the blank.

17. The method of cutting a bevel gear which consists in moving a tool in a circular path in a plane substantially tangent to the pitch surface of the gear to be produced to shape the tooth, producing a generating motion of the blank and the tool to generate the tooth, and imparting a continuous indexing movement to the blank.

18. The method of cutting a bevel gear which consists in moving a tool in a circular path in a plane substantially tangent to the pitch surface of the gear to be produced to shape the tooth, and simultaneously imparting to the blank a combined indexing movement and rolling movement with reference to the tool, whereby each tooth is generated and the blank is indexed between successive operations of the tool.

19. In a machine for cutting curved teeth, the combination with a blank carrier, of a plurality of tools movable in a curved path across the face of the blank, means for producing a relative rolling motion between the blank carrier and tools to generate the sides of the teeth, and means for imparting a continuous indexing movement to the blank.

20. In a machine for cutting curved teeth, the combination with a blank carrier, of a plurality of tools movable in a curved path across the face of the blank, the cutting edges of adjacent tools being arranged to cut on relatively opposite portions of the teeth of the blank, and means for producing a continuous indexing movement of the blank.

21. In a machine for cutting teeth, the combination with a blank carrier, of a plurality of tools movable in a curved path across the face of the blank, the adjacent tools having their cutting edges arranged to engage relatively opposite portions of the teeth of the blank, means for imparting a relative rolling motion to the blank carrier and tools to generate the sides of the teeth, and means for simultaneously producing a continuous indexing movement of the blank.

22. In a machine for cutting curved teeth, the combination with a blank carrier, of a plurality of tools movable in a curved path across the face of the blank, means for imparting a rolling motion to the blank carrier to generate the sides of the teeth, and means for imparting a continuous indexing movement to the blank carrier.

23. In a machine for cutting curved teeth, the combination with a blank carrier, of a plurality of tools movable in a curved path across the face of the blank, means for imparting a relative rolling motion to the blank carrier and tools to generate the sides of the teeth, and means for producing a continuous indexing movement of the blank carrier.

24. In a machine for cutting curved teeth, the combination with a blank carrier, of a plurality of tools movable in a curved path across the face of the blank, the cutting edges of adjacent tools being arranged to cut on relatively opposite portions of the teeth of the blank, means for producing a rolling motion of the blank carrier to generate the sides of the teeth, and means for imparting a continuous indexing movement to the blank.

25. In a machine for cutting curved teeth, the combination with a blank carrier, of a plurality of tools movable in a curved path across the face of the blank, the cutting edges of adjacent tools being arranged to cut on relatively opposite portions of the blank, means for producing a generating motion of the blank carrier and tools to generate the sides of the teeth, and means for imparting a continuous indexing movement to the blank carrier.

26. In a machine for cutting curved teeth, the combination with a blank carrier, of a rotary tool head, a plurality of tools on the head having their cutting edges substantially the same distance from the center and movable in a curved path in a plane substantially tangent to the pitch surface of the gear to be produced, and means for producing a continuous indexing movement of the blank coördinated with the rotation of the tool head so as to cause the tools to engage with different teeth on the blank during a single revolution of the head.

27. In a machine for cutting curved teeth, the combination with a blank carrier, of a rotary tool head, a plurality of tools carried on the tool head and movable in a curved path across the face of the blank, the tools having engagement with different teeth on the blank during a single revolution of the tool head, means for producing a relative rolling motion between the blank carrier and tool head to generate the sides of the teeth, and means for imparting a continuous indexing movement to the blank carrier.

28. In a machine for cutting curved teeth, the combination with a blank carrier, of a rotary tool head, a plurality of tools carried on the tool head and movable in a curved path across the face of the blank, means for producing a rolling motion of the blank carrier to generate the sides of the teeth, and means for imparting a continuous indexing movement to the blank carrier.

29. In a machine for cutting curved teeth, the combination with a blank carrier, of a rotary tool head, a plurality of tools carried on the tool head and movable in a curved path across the face of the blank, the tools having engagement with different teeth on the blank during a single revolution of the tool head, means for producing a generating motion of the tool head and blank carrier to generate the sides of the teeth, and means for imparting a continuous indexing movement to the blank carrier.

30. In a machine for cutting curved teeth, the combination with a tool moving continuously in a circular path, of a blank carrier having a continuous indexing movement, and means for producing a relative rolling motion between the blank carrier and tool.

31. In a machine for cutting curved teeth, the combination with a tool moving continuously in a circular path, of a blank carrier having a continuous indexing movement, and means for imparting to the blank carrier an additional movement of rolling with relation to the tool to generate the sides of the teeth.

32. In a machine for cutting curved teeth, the combination with a tool moving continuously in a circular path, of a blank carrier having a continuous indexing movement, means for imparting a rolling movement to the tool, and means for producing an additional rolling movement of the blank carrier with relation to the tool to generate the sides of the teeth.

33. In a machine for cutting curved teeth, the combination with a continuously rotating blank carrier, of a rotary tool head and a series of tools arranged concentrically of the head in spaced relation to each other and extending in a direction perpendicular to the face of the head so as to cut a surface substantially perpendicular to the axis of the tool head, the adjacent tools having their cutting edges oppositely arranged for engagement with different portions of the blank as the latter is rotated.

34. In a machine for cutting curved teeth, the combination with a continuously rotating blank carrier, of a rotary tool head and a series of tools arranged on the tool head in spaced relation to each other, the alternate tools having their cutting edges extending in opposite directions and engaging with different portions of the blank during a revolution of the tool head.

35. In a machine for cutting curved teeth, the combination with a rotary tool head, of a series of tools arranged concentrically of the head in spaced relation to each other and extending in a direction perpendicular to the face of the head so as to cut a surface substantially perpendicular to the axis of the head, the adjacent tools having their cutting edges oppositely disposed.

36. In a machine for cutting curved teeth, the combination with a rotary tool head, of a series of tools arranged on the head in spaced relation to each other and extending in a direction perpendicular to the face of the head so as to cut a surface substantially perpendicular to the axis of the head, the adjacent tools having their cutting edges oppositely disposed.

37. The method of generating spiral bevel gears, comprising the movement of a series of generating tools through the same path in a plane substantially tangent to the pitch surface of the gear to be produced transversely of the gear blank and through an endless orbit, and simultaneously imparting to said gear blank a combined rolling and rotational movement by which successive tools generate successive teeth.

38. The method of cutting longitudinally curved teeth in a bevel gear blank which consists in rotating a plurality of cutting tools, at a uniform radial distance from a common axis, imparting to the blank a continuous rotary indexing movement about its axis, and simultaneously effecting a relative rolling generating movement between the tools and blank over the pitch cone of the latter.

39. The method of cutting longitudinally curved teeth in a bevel gear blank which consists in imparting to the blank a continuous rotary indexing movement about its axis, rotating a plurality of tools of substantially uniform radius to represent an intermeshing gear, and simultaneously effecting a relative rolling generating movement between the pitch cone of the blank and the pitch surface of the gear represented by said tools.

40. The method of cutting longitudinally curved teeth in a bevel gear blank which consists in imparting to the blank a continuous rotary indexing movement about its axis, rotating a cutter having a plurality of cutting tools in continuous intermeshing relation with a plurality of teeth cut in the blank during each rotation of the cutter, and simultaneously effecting a relative rolling movement between the tools and blank over the pitch cone of the latter to generate the tooth profiles.

41. A machine for cutting longitudinally curved teeth in a bevel gear blank comprising a carrier for the blank having a continuous rotary indexing movement, a plurality of cutting tools rotatable about a common axis at substantially equal distances therefrom and arranged to coöperate with said carrier for producing longitudinally curved teeth on said blank, and actuating means for effecting a relative rolling movement between said tools and blank on the pitch cone of the latter to feed the blank and tools and generate the teeth profiles.

42. A machine for cutting longitudinally curved teeth in a bevel gear blank comprising a carrier for the blank having a continuous rotary indexing movement, a rotary cutter having a plurality of tools arranged to coöperate with the carrier for producing longitudinally curved teeth in a bevel gear blank, actuating means for rotating the tools in intermeshing relation with a plurality of teeth cut in the blank during each rotation of the cutter for cutting all of the teeth at the same time, and means for effecting a simultaneous relative rolling movement of the carrier and tools over the pitch cone of the blank to feed the blank and tools and generate the tooth profiles.

43. A machine for cutting longitudinally curved teeth in a bevel gear blank comprising a carrier for the blank having a continuous rotary indexing movement about the blank axis, a rotary cutter having a plurality of tools arranged for coöperation with the carrier for producing longitudinally curved teeth in the bevel gear blank, actuating means for rotating the tools in continuous intermeshing relation with the teeth cut in the blank whereby said tools engage a plurality of blank teeth during each rotation of the cutter, a support for said carrier, a support for said cutter, and means for moving one of said supports during the cutting operation to effect a relative rolling movement of the carrier and tools over the pitch cone of the blank to feed the blank and tools and generate the tooth profiles.

JAMES E. GLEASON.
ARTHUR L. STEWART.

Witnesses:
H. E. STONEBRAKER,
RUSSELL B. GRIFFITH.